Patented Jan. 11, 1949

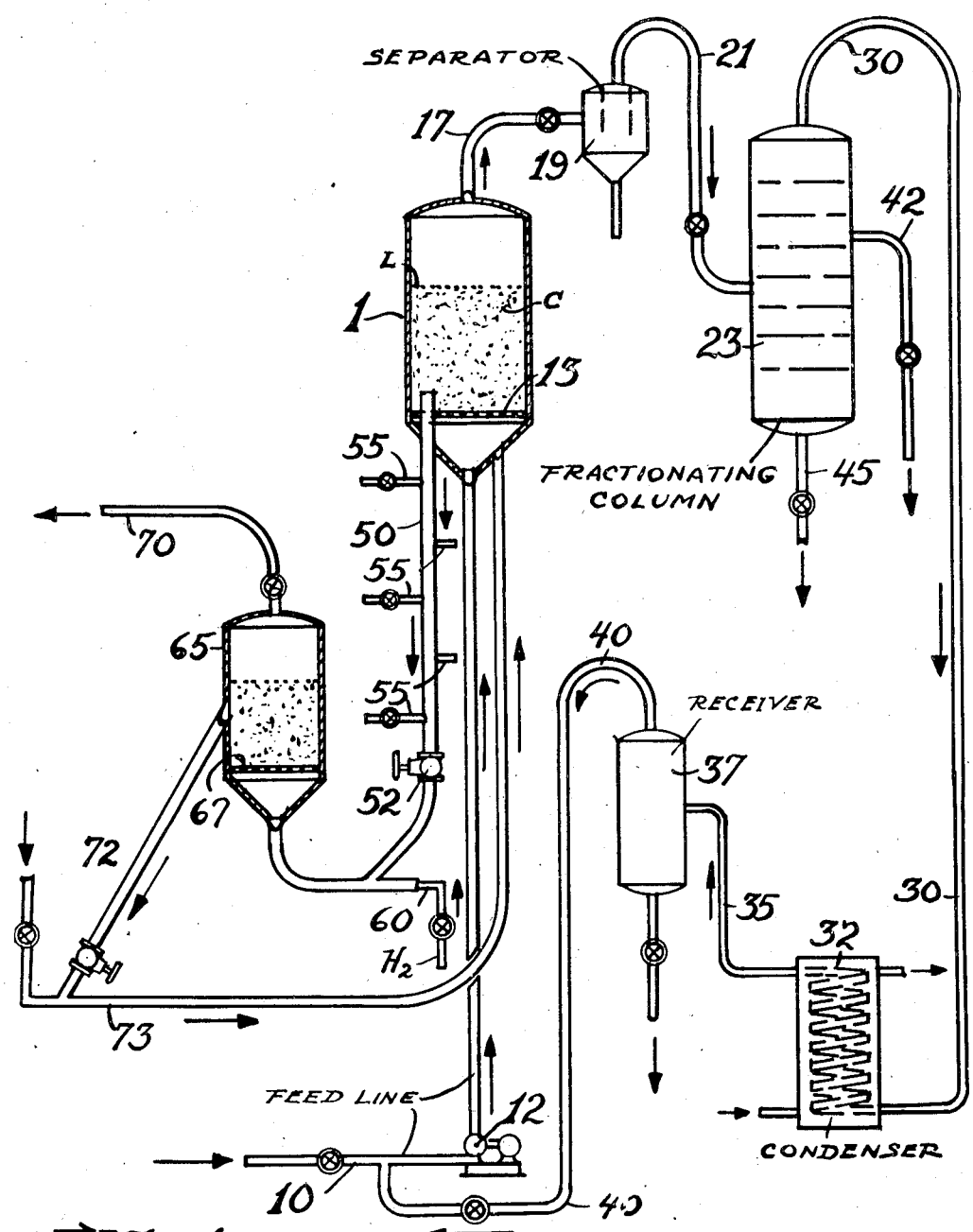

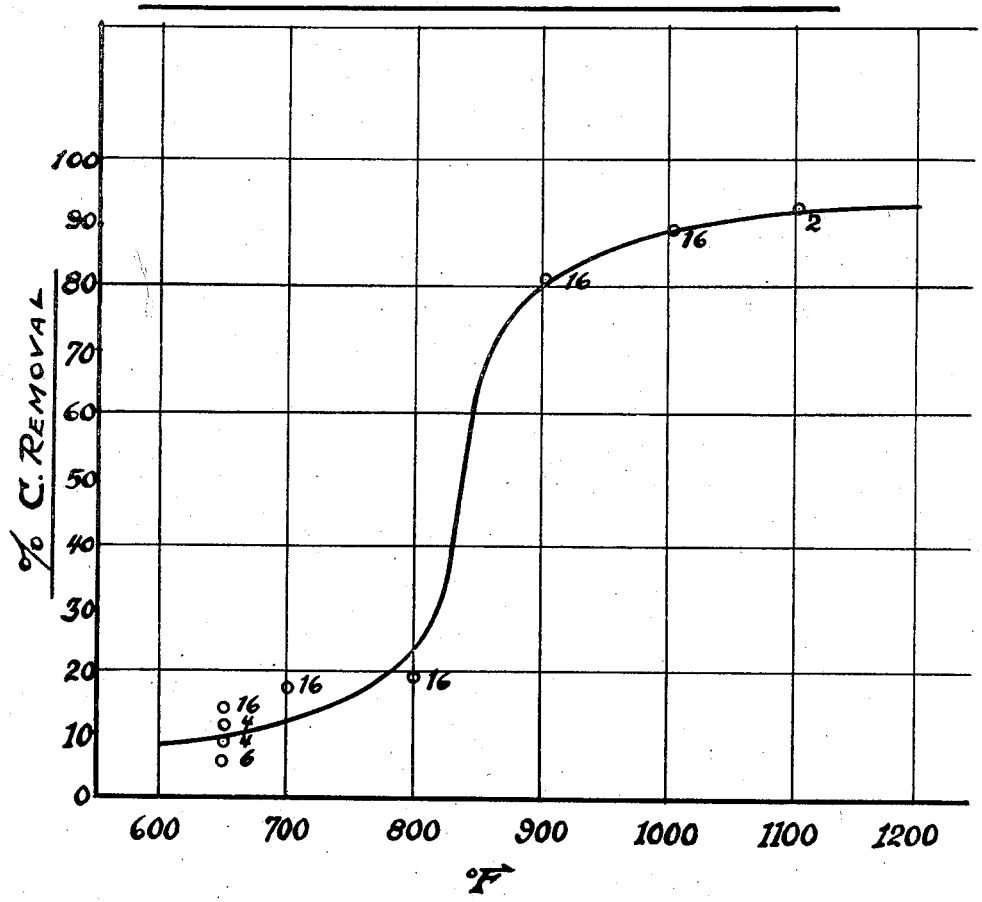

2,458,870

UNITED STATES PATENT OFFICE 2,458,870

HYDROGENATION OF AN OXIDE OF CARBON

Henry J. Ogorzaly, Summit, N. J., assignor to Standard Oil Development Company, a corporation of Delaware Application May 29, 1946, Serial No. 673,189

2 Claims. (Cl. 260—449.6)

The present invention relates to improvements in the art of synthesizing hydrocarbons and oxygenated hydrocarbons by a catalytic reaction involving carbon monoxide and hydrogen as reactants. More particularly, my present improvements relate to methods of cleansing the catalyst which, in the course of the foregoing reaction, acquires deposits of oily and waxy material and also deposits which contain oxygen, all of which will appear more fully in the following description, the drawing forming a part of the present specification, and the claims.

In my prior co-pending application, Serial No. 572,190 filed January 10, 1945, of which the present application is a continuation-in-part, I have described methods for cleansing or regenerating a catalyst of the type here in question by hydrogenating in situ the deposits formed on the catalyst during the process of reacting carbon monoxide and hydrogen, by reacting added hydrogen over and above that required to react with the carbon monoxide and, by that means, hydrogenating the heavy oily and waxy material on the catalyst to volatile compounds, thereby rendering the deposits adaptable for removal.

According to my present invention, I remove the fouled catalyst from the reactor and hydrogenate it in a separate vessel. The hydrogenation of the catalyst in the second vessel has the advantage that the hydrogenation may be carried out at the optimum temperature and pressure for the hydrogenation, the additional hydrogen and products of hydrogenation are not mixed with the hydrocarbon synthesis product, and the carbon to hydrogen ratio in the reaction zone will not be affected by the hydrogenation of the deposits on the catalyst.

My improvements are carried out in a so-called "fluid catalyst" type of operation, that is to say, an operation in which the catalyst in the form of a powder is suspended in the reactants in the reaction zone. This suspension is formed by causing the reactants to flow upwardly in the reaction zone at a velocity which is sufficient to maintain the catalyst in a turbulent, dense suspension above which the catalyst is maintained in dilute suspension, the dense phase being characterized by the fact that due to its turbulence, the catalyst is maintained at a substantially uniform temperature throughout its mass. In the hydrogenator the catalyst may also be in the form of a dense, turbulent, ebullient mass suspended in the hydrogen-containing gas, although under certain conditions it may be preferred to maintain it in the form of an "aerated," freely flowing mass through which the hydrogen gas passes quickly and without inducing violent turbulence within the bed.

In the course of the synthesis within the dense suspension of catalyst in the reactor, hydrocarbons of a wide range of molecular weight may be formed. At the same time oxygenated compounds may also be formed. In either case, the molecular weight varies from that of methane and other normally gaseous material to high boiling materials, the latter of which at room temperature may be solid. The operating conditions of temperature and pressure in the reaction zone determine the amount of the heavier hydrocarbons and oxygenated hydrocarbons which may be removed as a gas with the other gasiform materials leaving the reactor. Under certain conditions of operation the rate of production of the heavier hydrocarbons and oxygenated hydrocarbons exceeds the rate of removal of the said heavier hydrocarbons and oxygenated compounds leaving the reactor. Consequently, condensation occurs and these heavier materials are deposited on the catalyst in the form of liquids or solid materials. If the quantity of this deposit retained by the catalyst is allowed to build up, a condition may be reached wherein the catalyst particles begin to stick together, thereby losing their adaptability to be fluidized or formed into the suspensions previously mentioned. Even before this occurs the oxygenated hydrocarbon compounds deposited on the catalyst tend to cause physical disintegration thereof, with the production of unwarranted quantities of catalyst fines. While it is true that some catalyst will pass from the reactor with the crude gasiform material, the actual amount of this catalyst so withdrawn from the reactor, although it may contain a heavy deposit thereon, will normally be insufficient to prevent accumulation of the deposit on the catalyst within the vessel to the extent that its adaptability to be fluidized is inhibited and that extensive disintegration of the catalyst begins. Hence, it is conventional to remove catalyst from the reactor and to treat it with a solvent to remove the materials contained thereon. Not only is this an expensive operation but it is impossible to remove completely the deposit from the catalyst by solvent extraction. It is also possible to burn the deposit from the catalyst, but in this case the catalyst must be reduced before re-employment and it frequently suffers deterioration during the cycle.

From the standpoint of long maintenance of catalyst activity and of suitable quality for good catalyst fluidization, it would be preferable to operate with no deposition of heavy hydrocarbons or heavy oxygenated hydrocarbons on the catalyst since the deposits will eventually decrease the activity of the catalyst in promoting synthesis and also result in a non-fluid bed. To prevent the deposition of contaminants on the catalyst, it would require a modification of the process wherein the production of heavy oil is eliminated either by the use of very selective catalysts or by adjusting the conversion, temperature and pressure conditions so that all of the heavy oils are vaporized and carried out of the reactor along with the reactants. But the conditions thus required are not compatible with the most economical utilization of the reactor and, hence, preferred operation would be one wherein a certain amount of heavy oil, wax, and oxygenated hydrocarbons are formed but in which the accumulation of such material on the catalyst is controlled in order not to lose its fluidity or activity.

It is, therefore, the main object of this invention to provide a process for the removal of high boiling materials from an operating hydrocarbon synthesis catalyst in a manner which is efficient, economical, and in nowise interferes with the operation of the hydrocarbon synthesis process itself under optimum conditions.

In the accompanying drawing, I have shown diagrammatically in Fig. I, an apparatus in which a preferred modification of my invention may be carried into effect; and in Fig. II, I have shown by means of a graph the effect of temperature in carbon removal from the catalyst upon hydrogenation of the latter.

Referring in detail to Fig. I, 1 represents a reactor of the so-called hindered settling type, that is to say, a reactor in which there is maintained in the reactor a dense, fluidized mass of catalyst in reactants. A mixture of carbon monoxide and hydrogen suitably proportioned enters the system through line 10, passes through a compressor 12, and is then discharged into the bottom of reactor 1, wherein it passes upwardly through a foraminous member 13 into a body of catalyst C, which is in the form of a dense suspension. This catalyst may be, for example, an iron catalyst or cobalt deposited on kieselguhr. The gases flow upwardly through the catalyst at a velocity of from ½ to 10 feet per second but, generally, proper bed density or suspension density is effected by causing the gas to flow at a rate of about 1½ feet per second where the catalyst has a particle size of 5 to 200 microns. As stated, this velocity causes the formation of a dense suspension of catalyst in gasiform material and by controlling the actual amount of catalyst in the reactor, the dense suspension will have an upper level at L, above which the concentration of catalyst in gasiform material decreases so that in the space from L to the top of the reactor, disengaging of catalyst from gasiform material takes place to a considerable degree so that the gases issuing from the reactor contain a relatively small amount of catalyst. Stated otherwise, the dense suspension between 13 and L may have a density of 10 to 70 pounds per cubic foot, whereas the gases exiting from the reactor through line 17 may have a density of 0.001 to 0.1 pounds per cubic foot. As indicated, the crude product issues through line 17 and then may be forced through one or more dust separators, such as electrical precipitators or "cyclones" 19, for the purpose of removing a further portion of catalyst and then the vapors are withdrawn through a line 21 and discharged into a fractionating tower 23 where they are subjected to fractional distillation. In the fractional distillation column or tower 23, the normally gaseous material containing hydrocarbons, hydrogen, carbon monoxide, carbon dioxide and water is withdrawn overhead through line 30 and discharged into a water condenser 32 where it is cooled to a temperature below the condensation point of the water vapor, whereupon the cooled material is withdrawn through line 35 and discharged into a separator 37 from which water and light hydrocarbons are withdrawn from the bottom while the uncondensed material is recirculated via line 40 to line 10. A gasoline fraction is recovered from the fractionating tower 23 through line 42 and subjected to purification and further refining in conventional equipment (not shown). A heavy fraction may be recovered from the bottom of fractionating tower or column 23 through line 45 and utilized in a manner which does not go to the heart of the present invention. The description of the process for synthesizing hydrocarbons from carbon monoxide and hydrogen given hereinbefore represents a conventional method of operating a system employing the so-called fluid catalyst technique and does not include the improvements embodying my present invention, which latter, as stated, refer to improved methods for removing oily, waxy deposits from the catalyst.

Referring again to the reactor 1, as previously indicated waxy deposits accumulate on the catalyst and I remove the same by proceeding as follows. Catalyst is withdrawn from the reaction case 1 through a drawoff standpipe 50 controlled by a valve 52. As usual, the standpipe is provided with gas taps 55 into which a slow current of gas may be injected for the purpose of "fluidizing" the catalyst or, in other words, increasing its fluidity. This fouled catalyst is then discharged into a stream of hydrogen-containing gas introduced into the system through line 60. This hydrogen-containing gas may be heated in a furnace or other suitable means (not shown) before mixing with the catalyst. The suspension of catalyst in the hydrogen-containing gas thus formed is discharged into the bottom of hydrogenator 65, passing upwardly through a foraminous plate or grid 67 into the main body of the reactor where it is maintained in dense phase suspension, above which is a dilute phase suspension, by controlling the superficial velocity of the gas in the same manner as employed in forming the suspensions in reactor 1. The fouled catalyst may also be discharged directly from standpipe 50 through valve 52, into the hydrogenation vessel 65, into which catalyst-free hydrogen gas may be introduced through grid 67. Hereinafter I shall set forth operating data and results obtained but for the present I shall merely state that conditions of temperature are maintained within the hydrogenation zone so as to cause hydrogenation of the deposits on the catalyst to convert the said deposits into volatile decomposition products. The volatile products resulting from the hydrogenation reaction are withdrawn from the system through line 70 and delivered to equipment (not shown) for the purpose of recovering therefrom valuable products such as normally liquid hydrocarbons. The thus purified catalyst is withdrawn through a drawoff pipe 72, preferably through an "aerated" standpipe of the type 50, previously described, and discharged into, say, a stream of hydrogen or CO in the line 73 to form a suspension therein, which suspension is then returned to the reaction zone.

In the foregoing description, which is diagrammatic, I have omitted a full showing of numerous mechanical aids and accessory apparatus, such as flow meters, valves, pumps, and the like, in the interest of simplicity, but the engineer will understand that in a commercial unit this accessory apparatus would be included to enable the unit to be operated smoothly and efficiently.

I have found that the minimum temperature at which the hydrogenation is carried out in hydrogenator 65 must be in the neighborhood of 800 to 900° F. in atmospheric pressure operations. Attention is directed to Figure II wherein a fouled catalyst was treated at various temperatures, the graph showing that with operation above the indicated temperature level, the removal of "non extractable carbon" may be as great as about 93.1 per cent of that originally on the said catalyst while below this level it is of the order of 20 per cent or less. The chart was drawn from hydrogenation experiments on a deposit-contaminated powdered iron catalyst in a hydrogenation zone maintained under 1 atmosphere of hydrogen pressure at temperatures ranging from 650° F. to 1100° F. Before the hydrogenation runs were made the "wax" content and also the total carbon content in weight per cent was determined on each of the four samples of contaminated iron catalysts hydrogenated. By the term "wax" in the present application I refer to those deposits only on the catalyst which are soluble in benzene and which are substantially composed of hydrogen and carbon only while the total carbon, as determined by combustion, may contain oxygenated compounds and is in large part insoluble in benzene. In this connection carbon and hydrogen analyses indicated that the "wax" contained 86.5 weight per cent carbon and 13.5 per cent hydrogen. It is also clear from the appended table that the wax represented only $\frac{1}{10}$ to $\frac{1}{3}$ of the total carbon deposit. The samples hydrogenated were obtained from a fluid hydrocarbon synthesis pilot plant operating on the same general principle as that illustrated in Figure I. The operating conditions for the hydrogenation and the results thereof are set forth in the below Table I:

Table I

| Catalyst Sample | Wt. % Wax [1] | Hydrogen, Hours | Treatment Temp., °F. | Wt. Per Cent Carbon | | % C Removal |
|---|---|---|---|---|---|---|
| | | | | Before $H_2$ Treatment | After $H_2$ Treatment | |
| A | 12.7 | 4 | 650 | 33.2 | 29.4 | 11.5 |
| | | 16 | 650 | 33.2 | 28.4 | 14.5 |
| B | 9.2 | 4 | 650 | 35.2 | 33.1 | 6.0 |
| | | 16 | 700 | 35.2 | 29.0 | 17.5 |
| C | 5.1 | 4 | 650 | 38.6 | 35.2 | 9.0 |
| | | 16 | 800 | 38.6 | 31.2 | 19.1 |
| D | 5.6 | 16 | 900 | 40.6 | 7.9 | 81.5 |
| | | 16 | 1,000 | 40.6 | 4.2 | 89.7 |
| | | 2 | 1,100 | 40.6 | 2.8 | 93.1 |

[1] Contains approximately 86.5% carbon and 13.5% hydrogen.

The foregoing table as well as the chart in Figure II clearly shows that there is a break in the temperature carbon removal curve during the hydrogenation process at a temperature of from 800 to 900° F. and that at least this temperature must be maintained to effect satisfactory removal of the carbonaceous deposit from the catalyst at atmospheric pressure.

It is to be expected that the temperature necessary for cleansing the deposit from the catalyst by hydrogenation will be decreased by the utilization of higher pressure, and to a degree higher operating pressure may thus be exchanged for lower operating temperature.

In commercial operation the operating pressure in the hydrogenator 65 will most economically approximate the pressure in the reaction vessel 1 in order to facilitate the circulation of catalyst. The operating temperature and the holding time of the solid and the hydrogen gas flow rate are established by the degree of cleanup desired, suitable conditions being, for example, 400 pounds per square inch pressure, 900° F. temperature, 15 minutes catalyst holding time, and a hydrogen flow rate of 500 CF of hydrogen at standard conditions per pound of catalyst treated.

To recapitulate briefly, I have found that the contaminants formed on a catalyst during its use in the synthesis of hydrocarbons and oxygenated hydrocarbons may be effectively removed in a hydrogenation zone by treatment of the catalyst with a hydrogen-containing gas at temperatures in the order of 600° to 900° F., higher temperatures being also permissible. This hydrogenation operation will remove deposits on the catalyst not removable by the conventional washing with solvents as well as those removable thereby and with better results than removal by oxidation. It has the further advantage that the hydrogenation in conjunction with the main synthesis reaction is adapted to be operated continuously and cheaply.

What I claim is:

1. The method of forming hydrocarbons and oxygenated hydrocarbons which comprises reacting carbon monoxide and hydrogen in the presence of a powdered iron catalyst, which catalyst is maintained in the reactants, in the form of a dense fluidized mass in a reaction zone, maintaining said reaction zone at elevated temperatures and under superatmospheric pressure, with drawing catalyst contaminated by carbon-containing deposits during said reaction, conveying said contaminated catalyst into a separate hydrogenation zone, forming a dense fluidized mass of said contaminated catalyst in a hydrogen-containing gas in said hydrogenation zone, maintaining a temperature of at least about 900° F. in said hydrogenation zone, permitting the contaminated catalyst to remain resident in said reaction zone for a sufficient period of time to effect removal of at least about 80% of said contaminants, withdrawing cleansed catalyst from said hydrogenation zone and returning the cleansed catalyst to the reaction zone.

2. The process of claim 1 including the step of maintaining the hydrogenation zone under a pressure of the same order as that prevailing in the reaction zone.

HENRY J. OGORZALY.

REFERENCES CITED

The following references are of record in the file of this patent:

UNITED STATES PATENTS

| Number | Name | Date |
|---|---|---|
| 2,289,731 | Roelen | July 14, 1942 |
| 2,360,787 | Murphree | Oct. 17, 1944 |
| 2,414,276 | Sensel | Jan. 14, 1947 |